May 1, 1934.  E. W. BEIDLER  1,957,038
ROTARY PUMP AND MOUNTING PLATE THEREFOR
Filed Aug. 26, 1932
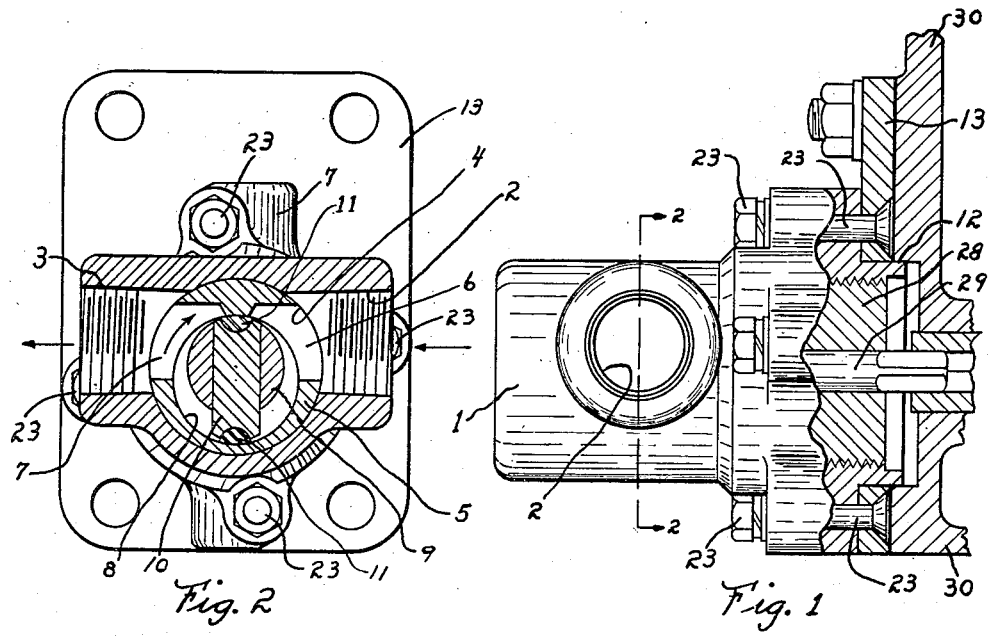
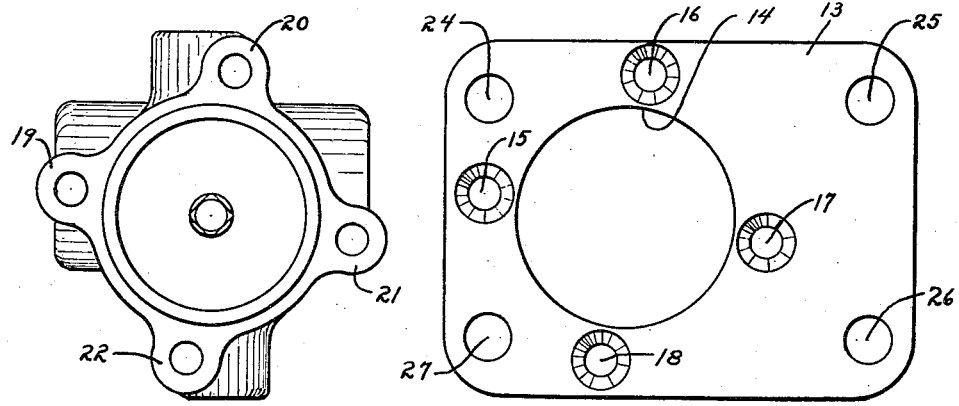
Inventor
Elliott W. Beidler
By Hull, Brock & West
Attorney Patented May 1, 1934

1,957,038

UNITED STATES PATENT OFFICE 1,957,038

ROTARY PUMP AND MOUNTING PLATE THEREFOR

Elliott W. Beidler, Avon, Ohio, assignor to Romec Pump Company, Elyria, Ohio, a corporation of Ohio Application August 26, 1932, Serial No. 630,567

3 Claims. (Cl. 103—118)

This invention relates to a rotary pump and mounting means therefor which is of such character that the pump may be supported in any one of a plurality of positions and rotated in either direction irrespective of the position of the supply and discharge pipes.

This pump is particularly adapted for use as a fuel pump for aircraft in which the fuel is highly volatile. Pumps of this general character heretofore in general use embody fixed inlet and outlet connections. With such pumps when it is desired to operate the pump in a reverse direction or when the supply and discharge lines are disposed so as to be out of alignment with the pump inlet and delivery ports, it is necessary to change the inlet and outlet connections which changes necessarily produce bends or angles in the supply and discharge lines. This is quite undesirable in aircraft fuel pumps in which the fuel is highly volatile as the fuel will volatilize and produce a vapor lock in these bends or angles which materially interferes with the action of the pump.

The main object of this invention is to eliminate these difficulties and to provide a pump in which the pump body or casing is adjustably secured to a mounting plate in such a manner that the pump may be set in four different positions which will permit inlet and discharge of fuel in four different planes without requiring material change in the inlet and discharge connections.

Another object of the invention is to provide a pump of the character described having the characteristics hereinbefore mentioned and which is well adapted for production at a very low cost.

Further and more limited objects of the invention will appear as the description proceeds and by reference to the accompanying drawing in which Fig. 1 is a view partly in section and partly in side elevation showing my improved pump and mounting plate therefor secured to an engine; Fig. 2 is a vertical sectional view on the line 2—2 of Fig. 1; Fig. 3 is an end view of the pump with the mounting plate removed and Fig. 4 is a detail view of the mounting plate.

Referring now to the drawing the pump consists essentially of a pump body or casing 1 which is preferably though not necessarily formed of a single piece of metal and provided with an inlet bore or passageway 2 and a discharge bore or passageway 3 both of which are interiorly threaded and adapted to receive suitable connections. The pump casing is shaped to provide a central bore or chamber 4 which is cylindrical in shape and open at its outer end and adapted to receive therein a suitable sleeve or bushing which is indicated by the reference character 5 and having ports 6 and 7 therein communicating with the inlet and discharge ports 2 and 3 respectively. The sleeve or bushing 5 is also provided with a bore or chamber 8 of suitable shape which is adapted to receive therein a rotor 9 through which extends a rigid blade 10 having recessed portions at the ends thereof receiving therein rockers 11 and 11 which engage with the periphery of the bore or chamber 8. The shape of the bore or chamber 8 is such that the rockers maintain contact with the inner periphery of the bore throughout its entire area.

The bore 4 in the pump casing is interiorly threaded adjacent its outer end and provided with an outwardly extending peripheral flange 12. This pump is adapted to be secured to the block of a suitable engine and the peripheral flange 12 is machined and of such a size as to fit within an opening provided therein. Fitting over the peripheral flange 12 is a mounting plate 13 having a central opening 14 therein adapted to receive the peripheral flange 12 therethrough. The mounting block 13 is also provided with openings 15, 16, 17 and 18. The pump casing 1 is also provided with a plurality of outwardly extending spaced apertured projections 19, 20, 21 and 22. The mounting plate is positioned over the outwardly projecting flange 12 and is secured to the pump casing by means of suitable bolts 23 which extend through the apertured projections 19, 20, 21 and 22 and the openings 15, 16, 17 and 18 provided in the mounting plate 13. The mounting plate is also provided with openings 24, 25, 26 and 27 adapted to receive suitable bolts therethrough by means of which the mounting plate is secured to the block of the engine. The sleeve 5 and the pump proper are secured in place within the chamber 4 by means of a circular block 28 which is threadedly secured therein. The block 28 is provided with a central opening through which extends the rotor shaft 29 the outer end of which is adapted to be connected with the engine in such a manner as to provide a driving connection for the pump. The details of this construction form no part of this invention and are therefore not illustrated.

This pump is designed and intended to be operated in either direction. Should the rotor be rotated in the direction indicated by the arrow in Fig. 2, the inlet connection will be connected to the intake port 6 and the discharge connection will be connected with the discharge port 3. Should the inlet and discharge connections be disposed on opposite sides of the pump, the pump body may be turned 180° from the position shown in Fig. 2 and still pump in the same direction. The turning of the body of the pump 180° on the mounting plate has the same effect as reversing the direction of rotation of the rotor. It will also be seen that the pump body may be turned 90° in either direction from the position shown in Fig. 2 and may be set in any one of four positions depending upon the position of the inlet and discharge pipes with respect to the inlet and discharge ports of the pump and the direction in which it is desired to have the rotor rotate. Such a construction eliminates the difficulties hereinbefore mentioned and avoids the necessity for having any bends or angles in the inlet and discharge pipes which would tend to provide a vapor lock or space in which air or volatile fuel would become trapped and interfere with the operation of the pump. In Fig. 1 the reference character 30 designates a portion of the motor block or engine to which the pump is connected and from which it is driven. It is to be understood that the rotor shaft 29 is operatively connected with the motor in a manner well known to those skilled in the art.

It will now be clear that I have provided a pump and mounting plate therefor which will accomplish the objects of the invention as hereinbefore stated. It will, of course, be understood that various changes may be made in the details of construction and arrangement of parts without departing from the spirit of my invention and the embodiment of the invention herein disclosed is to be considered as merely illustrative and is not to be considered in a limiting sense as the invention is limited only in accordance with the scope of the appended claims.

Having thus described my invention, what I claim is:

1. The combination with an engine, of a rotary fuel pump connected with said engine and adapted to be operated therefrom, said pump comprising a casing having a chamber formed therein and an inlet port and a discharge port disposed on opposite sides thereof, a sleeve fitting within said chamber and having a pair of ports therein communicating with said inlet and discharge ports respectively, a rotor secured within said sleeve and having a rigid vane extending therethrough, means operatively connecting said rotor with said engine, a pair of rockers carried by the ends of said rigid vane, a mounting plate securing said pump to said engine and means for securing said pump casing to said mounting plate in a plurality of different positions with respect thereto.

2. The combination with an engine, of a rotary fuel pump connected with said engine and adapted to be operated therefrom, said pump comprising a casing having a chamber formed therein and an inlet port and a discharge port disposed on opposite sides thereof, a sleeve fitting within said chamber and having a pair of ports therein communicating with said inlet and discharge ports respectively, a rotor secured within said sleeve and having a rigid vane extending therethrough, means operatively connecting said rotor with said engine, a pair of rockers carried by the ends of said rigid vane, a mounting plate adjustably secured to said pump casing and connecting said pump to said engine and means for securing said pump casing to said mounting plate in a plurality of different positions with respect to said inlet and discharge ports, said mounting plate having an opening therein receiving a portion of said pump casing therethrough.

3. The combination with an engine, of a rotary fuel pump connected with said engine and adapted to be operated therefrom, said pump comprising a casing, a rotor arranged within said casing and having a shaft projecting therefrom and connected with said engine, a mounting plate securing said pump to said engine and means for securing said pump casing to said mounting plate in any one of a plurality of positions whereby the inlet and discharge ports thereof may be disposed in different planes.

ELLIOTT W. BEIDLER.